United States Patent
Wang et al.

(10) Patent No.: US 8,959,531 B2
(45) Date of Patent: Feb. 17, 2015

(54) COORDINATING DEVICE AND APPLICATION BREAK EVENTS FOR PLATFORM POWER SAVING

(71) Applicant: Intel Corporation, Santa Clara, CA (US)

(72) Inventors: Ren Wang, Portland, OR (US); Jr-Shian Tsai, Portland, OR (US); Tsung-Yuan C. Tai, Portland, OR (US); Mesut A. Ergin, Portland, OR (US); Prakash N. Iyer, Portland, OR (US); Bruce L. Fleming, Morgan Hill, CA (US)

(73) Assignee: Intel Corp, Santa Clara, CA (US)

( * ) Notice: Subject to any disclaimer, the term of this patent is extended or adjusted under 35 U.S.C. 154(b) by 0 days.

(21) Appl. No.: 14/105,770

(22) Filed: Dec. 13, 2013

(65) Prior Publication Data

US 2014/0101674 A1   Apr. 10, 2014

Related U.S. Application Data

(63) Continuation of application No. 12/888,855, filed on Sep. 23, 2010, now Pat. No. 8,612,998.

(51) Int. Cl.
*G06F 13/00* (2006.01)
*G06F 9/54* (2006.01)
*G06F 1/32* (2006.01)

(52) U.S. Cl.
CPC .............. *G06F 9/542* (2013.01); *G06F 1/3203* (2013.01)
USPC ............................ 719/318; 719/320; 719/323

(58) Field of Classification Search
CPC ........ G06F 3/14; G06F 9/45512; G06F 9/542
USPC ........................................... 719/318, 320, 323
See application file for complete search history.

(56) References Cited

U.S. PATENT DOCUMENTS

| | | | |
|---|---|---|---|
| 5,832,286 A | 11/1998 | Yoshida | |
| 6,457,082 B1 * | 9/2002 | Zhang et al. | 710/260 |
| 6,711,644 B1 | 3/2004 | Accapadi et al. | |
| 7,093,141 B2 | 8/2006 | Elnozahy et al. | |

(Continued)

FOREIGN PATENT DOCUMENTS

| | | |
|---|---|---|
| CN | 1508652 A | 6/2004 |
| CN | 101198923 A | 6/2008 |

(Continued)

OTHER PUBLICATIONS

Office Action received for Chinese Patent Application No. 201180002743.7, mailed on Jan. 16, 2014, 15 pages of Office Action Including 4 pages of English Translation.

(Continued)

*Primary Examiner* — Andy Ho
(74) *Attorney, Agent, or Firm* — Green, Howard & Mughal LLP

(57) ABSTRACT

Systems and methods of managing break events may provide for detecting a first break event from a first event source and detecting a second break event from a second event source. In one example, the event sources can include devices coupled to a platform as well as active applications on the platform. Issuance of the first and second break events to the platform can be coordinated based on at least in part runtime information associated with the platform.

30 Claims, 3 Drawing Sheets

(56) References Cited

U.S. PATENT DOCUMENTS

| | | |
|---|---|---|
| 7,454,632 B2 | 11/2008 | Kardach et al. |
| 7,577,856 B2 | 8/2009 | Oshins et al. |
| 8,024,590 B2 | 9/2011 | Song et al. |
| 8,195,750 B1 | 6/2012 | Bakhmutov |
| 8,279,790 B2 | 10/2012 | Wang et al. |
| 8,468,601 B1 | 6/2013 | Bakhmutov |
| 8,599,729 B2 | 12/2013 | Gobriel et al. |
| 8,601,296 B2 * | 12/2013 | Jeyaseelan et al. .......... 713/320 |
| 8,612,998 B2 | 12/2013 | Wang et al. |
| 8,635,469 B2 | 1/2014 | Wang et al. |
| 2006/0075347 A1 | 4/2006 | Rehm |
| 2008/0168452 A1 | 7/2008 | Molaro et al. |
| 2008/0222311 A1 | 9/2008 | Lee et al. |
| 2009/0150695 A1 | 6/2009 | Song et al. |
| 2009/0150696 A1 * | 6/2009 | Song et al. ................ 713/323 |
| 2010/0077107 A1 | 3/2010 | Lee et al. |
| 2010/0153590 A1 | 6/2010 | Hsin et al. |
| 2010/0169683 A1 | 7/2010 | Wang et al. |
| 2012/0079304 A1 * | 3/2012 | Weissmann et al. ......... 713/324 |
| 2012/0079482 A1 | 3/2012 | Wang et al. |

FOREIGN PATENT DOCUMENTS

| | | |
|---|---|---|
| JP | 2006-072698 | 3/2006 |
| JP | 2012-003691 | 1/2012 |
| JP | 2012-503257 A | 2/2012 |
| WO | 03063002 A1 | 7/2003 |
| WO | 2012/040068 A1 | 3/2012 |

OTHER PUBLICATIONS

International Search Report and Written Opinion received for PCT Patent Application No. PCT/US2011/052045, mailed on Feb. 28, 2012, 9 Pages.

International Preliminary Report on Patentability received for PCT Patent Application No. PCT/US2011/052045, mailed on Apr. 4, 2013, 6 Pages.

Office Action received for Korean Patent Application No. 2013-7007334, mailed on Apr. 30, 2014, 1 pages of English Translation only.

International Search Report and Written Opinion received for PCT Patent Application No. PCT/US2013/048765, mailed on Mar. 31, 2014, 12 pages.

Office Action received for Japanese Patent Application No. 2013-529384, mailed on Apr. 8, 2014, 6 pages of Office Action Including 3 pages of English Translation.

Office Action received for Chinese Patent Application No. 201180002743.7, mailed on Aug. 22, 2014, 9 pages of Office Action including 4 pages of English Translation.

* cited by examiner

FIG. 4
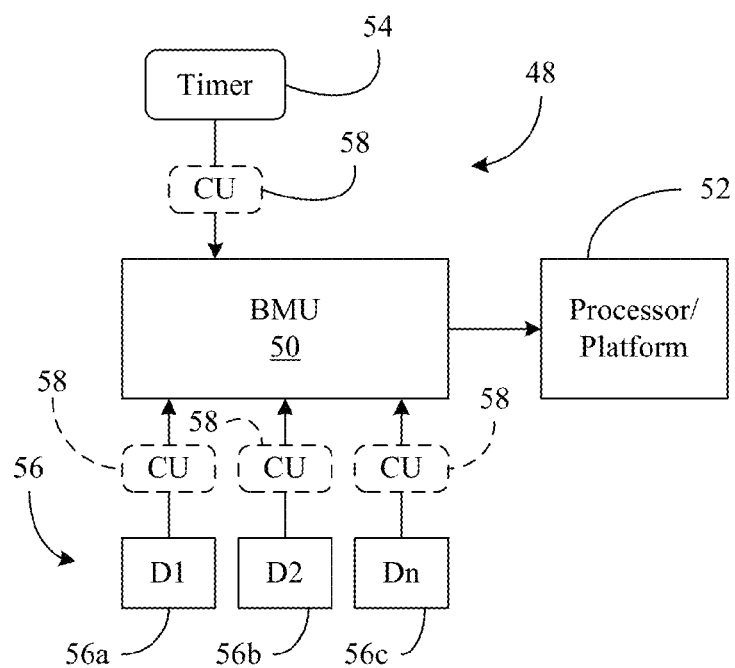
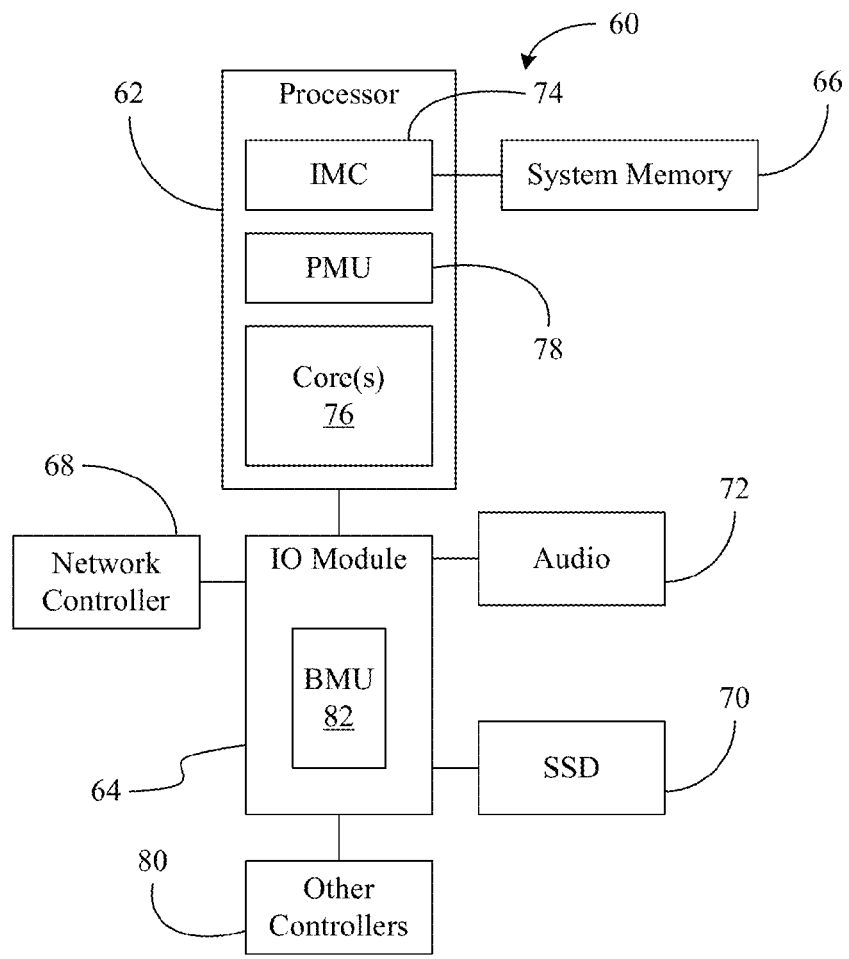
FIG. 5

COORDINATING DEVICE AND APPLICATION BREAK EVENTS FOR PLATFORM POWER SAVING

CROSS-REFERENCE TO RELATED APPLICATIONS

This application is a continuation of U.S. patent application Ser. No. 12/888,855, filed Sep. 23, 2010, now U.S. Pat. No. 8,612,998.

BACKGROUND

1. Technical Field

Embodiments generally relate to the management of platform break events. More particularly, embodiments relate to coordinating the issuance of break events from different sources in order to enhance platform power savings.

2. Discussion

In conventional mobile computing platforms, multiple IO (input/output) devices (e.g., communication interfaces) and software applications may tend to generate uncoordinated break events, which can prevent the platform and its components from rapidly entering lower power states and staying in those states for extended periods of time. Indeed, shorter and sub-optimal battery life could result in the platform remaining in high power states more often than necessary.

BRIEF DESCRIPTION OF THE DRAWINGS

The various advantages of the embodiments of the present invention will become apparent to one skilled in the art by reading the following specification and appended claims, and by referencing the following drawings, in which:

FIG. 4 is a block diagram of a break event management unit and a plurality of coalescing units according to an embodiment; and FIG. 5 is a block diagram of an example of a platform according to an embodiment.

DETAILED DESCRIPTION

Embodiments may provide for a method in which a first break event from a first event source is detected and a second break event from a second event source is detected. The method can also provide for coordinating issuance of the first and second break events to a platform based on at least in part runtime information associated with the platform.

Other embodiments may include a computer readable storage medium having a set of instructions which, if executed by a processor, cause a computer to detect a first break event from a first event source and detect a second break event from a second event source. The instructions can also cause a computer to coordinate issuance of the first and second break events to a platform based on at least in part runtime information associated with the platform.

In addition, embodiments can include an apparatus having an input/output (IO) module with logic to detect a first break event from a first event source and detect a second break event from a second event source. The logic may also coordinate issuance of the first and second break events to a platform based on at least in part runtime information associated with the platform.

Embodiments may also include a system having a first event source, a second event source, a processor and an input/output (IO) module coupled to the processor. The IO module can have logic to detect a first break event from the first event source, and detect a second break event from a second event source. In addition, the logic may coordinate issuance of the first and second break events to the system based on at least in part runtime information associated with the system.

Figure 1:
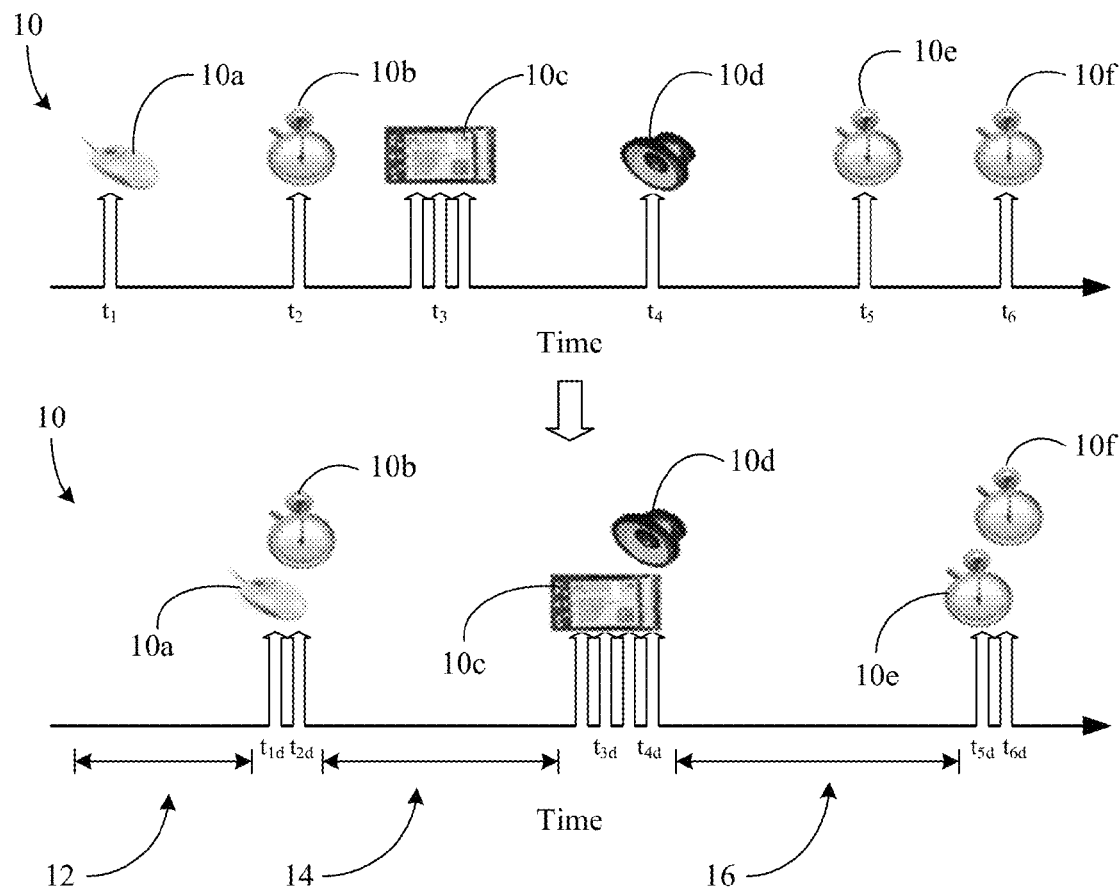
FIG. 1 is a block diagram of an example of a plurality of coordinated break events according to an embodiment.

Turning now to FIG. 1, a plurality of break events 10 (10a-10f) from different sources (e.g., power management entities) is shown before and after coordinating issuance of the break events 10 to a platform. In the illustrated example, an input/output (IO) event 10a (e.g., interrupt) from a device such as a mouse is requested for time instance $t_1$, and a timer event 10b from an active application running on the platform is requested for time instance $t_2$. In addition, a series of IO events 10c from another device such as a network interface card (NIC) may be requested for time instance $t_3$. As will be discussed in greater detail, the IO events 10c might themselves be grouped together by a coalescing unit disposed either on the NIC or at a central location. An IO event 10d from an audio device may also be requested for time instance $t_4$. Additionally, the illustrated example demonstrates the detection of timer events 10e and 10f from active applications for time instances $t_5$ and $t_6$, respectively. In their native state, the break events 10 might have a time profile that would prevent the platform from entering certain power saving states for extended periods of time.

Accordingly, the issuance of the break events 10 to the platform can be coordinated to enable the platform to reduce power consumption. For example, the illustrated IO event 10a from the mouse is deferred until a deferred time instance $t_{1d}$ so that it may be aligned with the issuance of the application timer event 10b, which may be issued at a deferred time instance $t_{2d}$. In another example, the timer event 10b might be a non-deferrable event. In such a case, the IO event 10a may be deferred, whereas the timer event 10b could be issued as scheduled. In either case, an extended idle time period 12 can be created, wherein the platform may enter deeper power saving states (e.g., ACPI/Advanced Configuration and Power Interface Specification, ACPI Specification, Rev. 4.0, Jun. 16, 2009, low power states) more quickly and for longer periods of time due to the extended time period 12. In addition, the IO events 10c from the NIC can be aligned with the IO event 10d from the audio device at deferred time instances $t_{3d}$ and $t_{4d}$, respectively, to create another extended time period 14. Similarly, the application timer events 10e and 10f may be deferred to time instances $t_{5d}$ and $t_{6d}$, respectively, which can result in an extended time period 16. Simply put, the extended time periods 12, 14, 16 may enable enhanced platform power savings and longer battery life.

Figure 2:
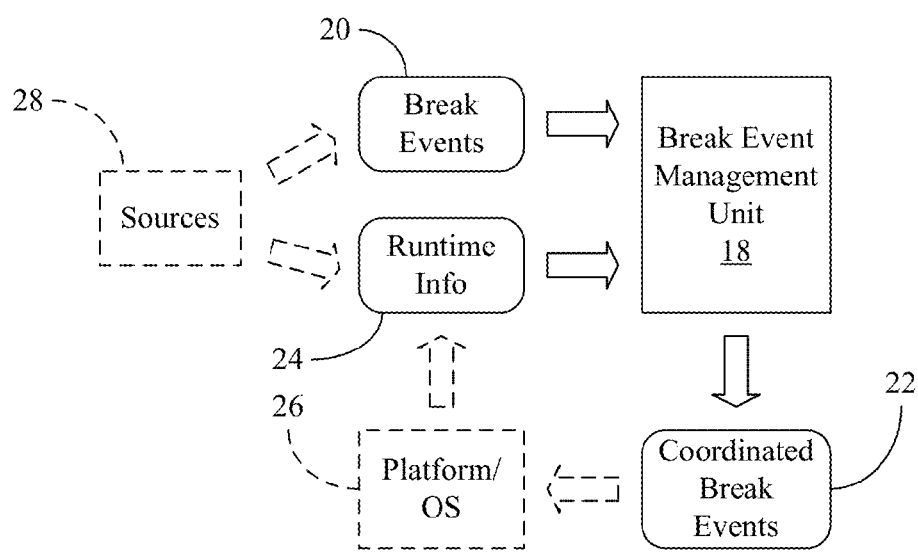
FIG. 2 is a block diagram of an example of a break event management unit according to an embodiment.

FIG. 2 shows a break event management unit (BMU) 18 that can detect break events 20 and align them as coordinated break events 22 based on at least in part runtime information 24 associated with a platform/OS (operating system) 26. The BMU 18 might be implemented in a module of the platform 26, such as a system control unit (SCU) of a mobile Internet device (MID) platform or a platform controller hub (PCH) of a laptop platform. Indeed, the BMU 18 may reside in the operating system (OS) kernel space with slightly different interfaces and implementation techniques or in the user space. In the illustrated example, the runtime information 24 can be obtained from the sources 28 of the break events 20 as well as the platform 26 itself. For example, runtime information 24 obtained from a device coupled to the platform might include QoS (quality of service) specifications that identify a maximum delay time for one or more IO events. In addition, runtime information 24 obtained from an application could identify a deferability characteristic of one or more timer events. For example, if a timer event is not deferrable, the BMU 18 may attempt to align other break events with the non-deferrable timer event. Otherwise, the BMU 18 could manage the timer events for optimal platform power saving and performance.

By way of example, if an application requests that a timer event occur every 50 ms, deferrable to a maximum frequency of every 100 ms, the BMU 18 may trigger the timer event every 100 ms while the platform 26 is relatively inactive. If the platform 26 becomes more active, however, due to break events generated by other sources, the BMU 18 could adapt the issuance of the timer event towards 50 ms for better application performance, without a negative impact on power consumption.

In addition, the platform 26 may provide runtime information 24 in the form of a low power state break even time, programmable performance requirements, and so on. The low power state break even time may indicate the amount of time the platform 26 should stay in a particular low power state in order to offset/amortize any power cost overhead associated with entering and exiting the low power state. As will be discussed in greater detail, the BMU 18 may use the low power state break even time to determine a holding time for each deferred break event. In this regard, power saving benefits may decline rapidly when the holding time becomes much longer than the break even time, while the performance can degrade significantly. Thus, the BMU 18 may determine a reasonable holding time based on the break even time and the desired performance.

The programmable performance requirements could be defined by a user of the platform 26. Thus, if the user prefers higher performance, the holding time may be tuned downward to shorter values in order to provide faster response and improved performance (while potentially losing some power saving opportunities). If the user requests longer battery life, on the other hand, the holding time may be set to a relatively longer value in order to provide the platform 26 with more opportunity to remain in lower power states.

Figure 3:
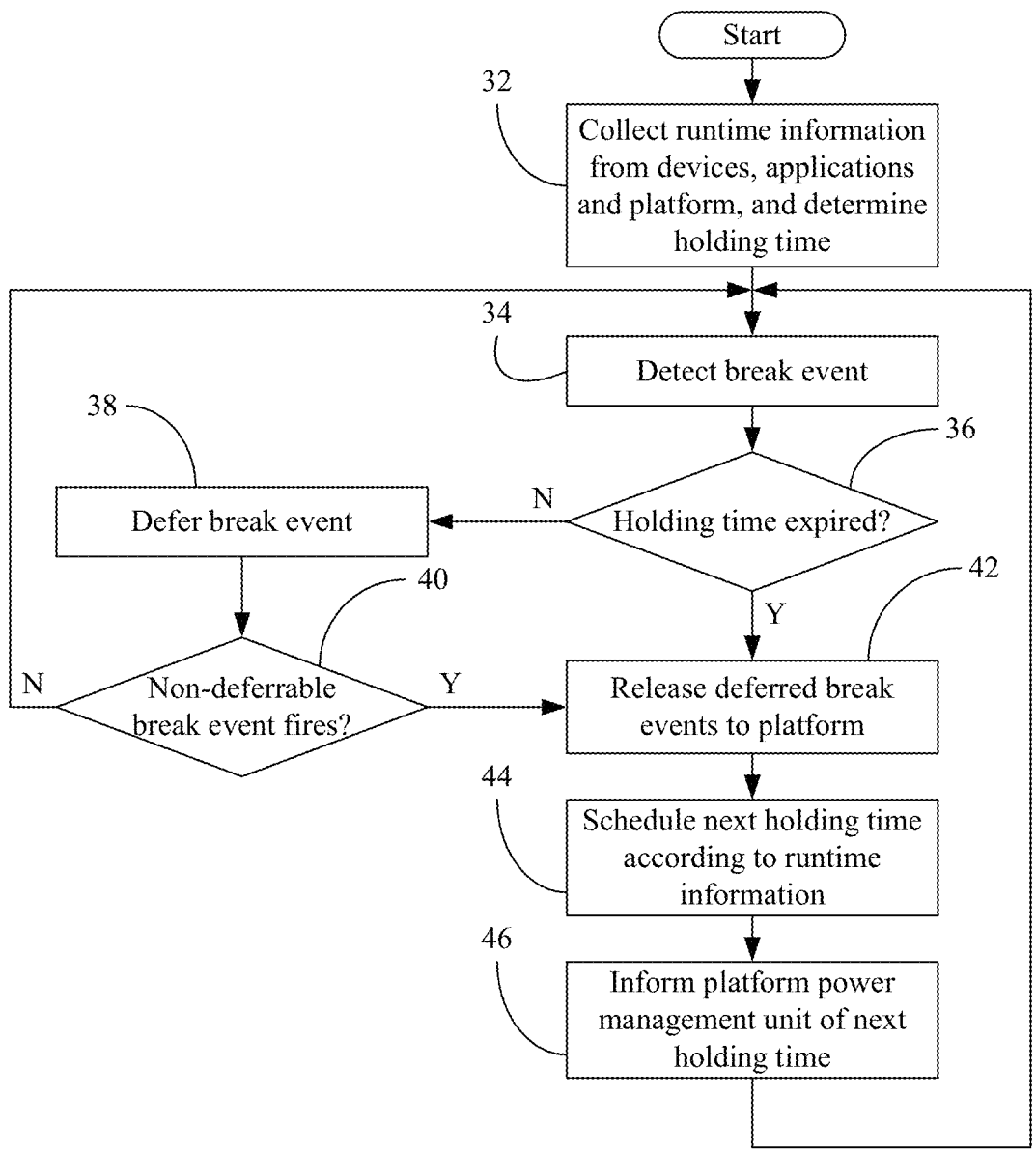
FIG. 3 is a flowchart of an example of a method of coordinating the issuance of break events according to an embodiment.

Turning now to FIG. 3, an exemplary method 30 of coordinating the issuance of break events is shown. The method 30 may be implemented in fixed-functionality hardware using circuit technology such as ASIC, complementary metal oxide semiconductor (CMOS) or transistor-transistor logic (TTL) technology, in executable software as a set of firmware and/or logic instructions stored in a machine- or computer-readable storage medium of a memory such as random access memory (RAM), read only memory (ROM), programmable ROM (PROM), flash memory, etc., or any combination thereof. Processing block 32 provides for collecting runtime information from devices, applications and the platform, and determining a holding time based on the runtime information. As already noted, the holding time determination may take into consideration low power break even times and programmable performance requirements, as well as maximum delay times for IO events and deferability characteristics of timer events.

If a break event is detected at block 34, a determination may be made at block 36 as to whether the holding time has expired. If not, the break event can be deferred at block 38. The deference of the break event could be achieved in a number of different ways depending on the circumstances. For example, the break event might be placed in a queue, wherein the queue could be collocated with the BMU 18 (FIG. 2), with the device issuing the break event, in a coalescing unit associated with the device, and so on. Indeed, if the break event is associated with a bus mastering transaction (e.g., DMA/direct memory access), the break event might be deferred by de-asserting a PCIe (Peripheral Components Interconnect Express) OBFF (opportunistic buffer flush/fill) signal to inform the source device that the PCIe bus is unavailable.

If either a non-deferrable break event is detected at block 40 or it is determined at block 36 that the holding time has expired, all deferred break events can be released/issued to the platform at block 42. Illustrated block 44 provides for scheduling the next holding time based on the collected runtime information. As already noted, the holding time can be adjusted dynamically. The platform power management unit can be informed of the next holding time at block 46.

FIG. 4 shows a system 48 in which a BMU 50 is coupled to a processor/platform 52 that receives various break events from application timers 54 and devices 56 (56a-56c), wherein the break events can cause the processor/platform 52 to exit (or prevent entry to) one or more low power states. In the illustrated example, the coalescing units 58 can be used to reduce the number of break events by, for example, combining multiple packets that might otherwise result in multiple break events, into a single break event. The coalescing units 58 may therefore be particularly useful for communication devices such as network controllers, although other devices and applications may also benefit from the coalescing process.

Starting from the initialization phase at boot time, the coalescing units 58 can obtain, or may already be aware of, system parameters such as override policies, device buffer sizes, device latency tolerance requirements, etc. These parameters can be used by the coalescing units 58 to determine an initial device/application-based holding time, which can later be adjusted based on the runtime behavior, as needed. During the runtime, the coalescing units 58 may track each break event capable device to determine whether the device has been quiet for a pre-determined period of time (e.g., no interrupts generated for the last $\alpha$ ms). Upon such inactivity, the coalescing unit 58 in question can enter a holding interval (e.g., for $\beta$ ms), within which no interrupts from this particular source will be relayed up to the BMU 50 and/or processor/platform 52. This approach may be implemented on a per-device/application basis and with different parameters for each device/application. In addition, certain strategies may be used to bypass the coalescing unit 58, such as high-performance/benchmarking modes, etc.

While the coalescing units 58 could be implemented in the devices 56 and application timer 54, locating them in the BMU 50 may be more scalable by eliminating any need for device manufacturers to support break event alignment. Implementing the coalescing unit 58 in the BMU 50 may involve ensuring that the upper limit of the holding timer $\beta$ is compatible with the device's internal buffer size in order to prevent buffer overruns. In addition, the inactivity timer $\alpha$ can be set to a large enough value so as to prevent premature expiration and any negative impact on maximum system performance.

A number of different strategies may be used for coalescing timer adaptation. For example, a "static policy" might involve linking the coalescing behavior to a user-set (or OS profile-based) system preferences. Thus, if a high-performance profile is preferred by the user, coalescing might be bypassed with $\beta=0$. For a balanced performance/power profile, a typical value of $\beta=5$ ms could be selected. For a low-power mode, with maximum power savings, a typical value of β=10 ms may be selected. Alternatively, a "dynamic policy" could be used in which β is controlled on a closed-loop basis, based on the average break event count observed over a certain counting period. The approach could therefore make the coalescing as non-intrusive as possible, so that the break event behavior (on the average sense) does not change significantly. Starting from a typically small β value, the number of break events from individual devices can be observed over relatively longer periods (i.e., on the order of seconds) of time, and β may be additively increased until the average number of events change significantly. Depending on the change, β could either reset to be adapted from scratch or multiplicatively decreased.

Turning now to FIG. 5, a system 60 is shown. The system 60 may be part of a mobile platform having computing functionality (e.g., personal digital assistant/PDA, laptop), communications functionality (e.g., wireless smart phone), imaging functionality, media playing functionality, or any combination thereof (e.g., mobile Internet device/MID). In the illustrated example, the system 60 includes a processor 62, an integrated memory controller (IMC) 74, an IO module 64, system memory 66, a network controller (e.g., network interface card) 68, an audio IO device 72, a solid state disk (SSD) 70, and one or more other controllers 80. The processor 62, which may include a core region with one or several processor cores 76, may use a power management unit (PMU) 78 to place its cores 76 and other system components into one or more active and/or idle states based on performance and/or power management concerns, as already noted.

The illustrated IO module 64, sometimes referred to as a Southbridge or South Complex of a chipset, functions as a host device and communicates with the network controller 68, which could provide off-platform communication functionality for a wide variety of purposes such as cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The IO module 64 may also include one or more wireless hardware circuit blocks to support such functionality.

The SSD 70 may include one or more NAND chips and might be used to provide high capacity data storage and/or a significant amount of parallelism. There may also be solutions that include NAND controllers implemented as separate application specific integrated circuit (ASIC) controllers being connected to the IO module 64 on standard buses such as a Serial ATA (SATA, e.g., SATA Rev. 3.0 Specification, May 27, 2009, SATA International Organization/SATA-IO) bus, or a PCI Express Graphics (PEG, e.g., Peripheral Components Interconnect/PCI Express x16 Graphics 150W-ATX Specification 1.0, PCI Special Interest Group) bus. The SSD 70 could also be used as a USB (Universal Serial Bus, e.g., USB Specification 2.0, USB Implementers Forum) flash storage device.

The illustrated IO module 64 includes a BMU 82 that is configured to detect break events from a plurality of different sources such as the network controller 68, audio IO device 72, SSD 70, active applications executing on the processor 62, etc., and coordinate issuance of the break events to the processor 62 based on runtime information associated with the system 60. In one example, coordinating issuance of the break events includes determining a holding time based on the runtime information and deferring at least one of the break events based on the holding time. For example, the system 60 might execute a VoIP (voice over Internet Protocol) application in which the network controller 68 and the audio IO device 72 each actively generate IO events little or no regard for the IO events generated by the other device. By using the BMU 82 to coordinate the break events from the network controller 68 and audio IO device 72, the illustrated IO module 64 can enable the components of the system 60 to enter deeper low power states for longer periods of time, and therefore significantly enhance the power savings achieved by the system 60.

Thus, the above techniques can provide a holistic approach to defining computing system architectures and interfaces so that they coordinate and align activities of multiple IO devices and applications. As a result, platform idleness may be maximized for optimal platform power saving. In addition, such coordination and alignment could enable the platform to more closely approximate an ideal "work-load proportional" power consumption with robust performance.

Embodiments of the present invention are applicable for use with all types of semiconductor integrated circuit ("IC") chips. Examples of these IC chips include but are not limited to processors, controllers, chipset components, programmable logic arrays (PLA), memory chips, network chips, systems on chip (SoCs), SSD/NAND controller ASICs, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
   detecting a break event;
   determining a holding time for the break event based on an amount of time a platform is to remain in a low power state at least to offset a power cost overhead associated with an entrance to the low power state and an exit from the low power state; and
   deferring an issuance of the break event to the platform until the holding time has expired.

2. The method of claim 1, further including determining a deferability characteristic of the break event.

3. The method of claim 2, further including:
   determining a deferrable break event;
   adjusting the issuance of the deferrable break event to a minimum frequency value when the platform is relatively active; and
   adjusting the issuance of the deferrable break event to a maximum frequency value when the platform is relatively inactive.

4. The method of claim 2, further including:
   determining a non-deferrable break event; and
   performing the issuance of the non-deferrable break event to the platform independently of whether the holding time has expired.

5. An apparatus comprising logic to:
   detect a break event;
   determine a holding time for the break event based on an amount of time a platform is to remain in a low power state at least to offset a power cost overhead associated with an entrance to the low power state and an exit from the low power state; and
   defer an issuance of the break event to the platform until the holding time has expired.

6. The apparatus of claim 5, wherein the logic is to:
   detect a plurality of break events; and
   defer the issuance of the plurality of break events until the holding time has expired.

7. The apparatus of claim 5, wherein the holding time is to be one of equal to and less than the amount of time the platform is to remain in the low power state at least to offset the power cost overhead.

8. The apparatus of claim 5, wherein the logic is to determine the holding time further based on a performance requirement.

9. The apparatus of claim 5, wherein the logic is to:
   identify a plurality of packets that result in a plurality of break events; and
   combine the plurality of packets to result in a single break event.

10. The apparatus of claim 5, wherein the logic is to determine a deferability characteristic of the break event.

11. The apparatus of claim 10, wherein the break event is to include a deferrable break event, and wherein the logic is to:
    adjust the issuance of the deferrable break event to a minimum frequency value when the platform is relatively active; and
    adjust the issuance of the deferrable break event to a maximum frequency value when the platform is relatively inactive.

12. The apparatus of claim 10, wherein the break event is to include a non-deferrable break event, and wherein the logic is to perform the issuance of the non-deferrable break event to the platform independently of whether the holding time has expired.

13. The apparatus of claim 12, wherein the logic is to align an issuance of one or more other break events with the issuance of the non-deferrable break event.

14. The apparatus of claim 5, wherein the logic is to defer the issuance of the break event by issuing a de-asserting signal to inform a source of the break event that a bus is unavailable.

15. A non-transitory computer readable storage medium comprising a set of instructions which, if executed by a processor, cause a computer to:
    detect a break event;
    determine a holding time for the break event based on an amount of time a platform is to remain in a low power state at least to offset a power cost overhead associated with an entrance to the low power state and an exit from the low power state; and
    defer an issuance of the break event to the platform until the holding time has expired.

16. The non-transitory computer readable storage medium of claim 15, wherein a source of the break event is to include one or more of an input/output device, an active application, and the platform, and wherein the break event is to include an input/output event.

17. The non-transitory computer readable storage medium of claim 15, wherein the set of instructions, if executed by the processor, cause the computer to detect a plurality of break events and defer the issuance of the plurality of break events until the holding time has expired.

18. The non-transitory computer readable storage medium of claim 15, wherein the holding time is to be one of equal to and less than the amount of time the platform is to remain in the low power state at least to offset the power cost overhead.

19. The non-transitory computer readable storage medium of claim 15, wherein the set of instructions, if executed by the processor, cause the computer to determine the holding time further based on a performance requirement.

20. The non-transitory computer readable storage medium of claim 15, wherein the set of instructions, if executed by the processor, cause the computer to identify a plurality of packets that result in a plurality of break events and combine the plurality of packets to result in a single break event.

21. The non-transitory computer readable storage medium of claim 15, wherein the set of instructions, if executed by the processor, cause the computer to determine a deferability characteristic of the break event.

22. The non-transitory computer readable storage medium of claim 21, wherein the break event is to include a deferrable break event, and wherein the set of instructions, if executed by the processor, cause the computer to adjust the issuance of the deferrable break event to a minimum frequency value when the platform is relatively active and adjust the issuance of the deferrable break event to a maximum frequency value when the platform is relatively inactive.

23. The non-transitory computer readable storage medium of claim 21, wherein the break event is to include a non-deferrable break event, and wherein the set of instructions, if executed by the processor, cause the computer to perform the issuance of the non-deferrable break event to the platform independently of whether the holding time has expired.

24. The non-transitory computer readable storage medium of claim 23, the set of instructions, if executed by the processor, cause the computer to align an issuance of one or more other break events with the issuance of the non-deferrable break event.

25. The non-transitory computer readable storage medium of claim 15, the set of instructions, if executed by the processor, cause the computer to defer the issuance of the break event by issuing a de-asserting signal to inform a source of the break event that a bus is unavailable.

26. A system comprising:
a processor; and
a break event management unit coupled to the processor to:
   detect a break event;
   determine a holding time for the break event based on an amount of time a platform is to remain in a low power state at least to offset a power cost overhead associated with an entrance to the low power state and an exit from the low power state; and
   defer an issuance of the break event to the platform until the holding time has expired.

27. The system of claim 26, wherein the break event management unit is to:
   detect a plurality of break events; and
   defer the issuance of the plurality of break events until the holding time has expired.

28. The system of claim 26, wherein the break event management unit is to:
   identify a plurality of packets that result in a plurality of break events; and
   combine the plurality of packets to result in a single break event.

29. The system of claim 26, wherein the break event management unit is to:
   determine a deferrable break event, adjust the issuance of the deferrable break event to a minimum frequency value when the platform is relatively active, and adjust the issuance of the deferrable break event to a maximum frequency value when the platform is relatively inactive; and
   determine a non-deferrable break event and perform the issuance of the non-deferrable break event to the platform independently of whether the holding time has expired.

30. The system of claim 26, wherein the break event management unit is to defer the issuance of the break event by issuing a de-asserting signal to inform a source of the break event that a bus is unavailable.

* * * * *